(12) United States Patent
Shimozaki

(10) Patent No.: US 9,103,390 B2
(45) Date of Patent: Aug. 11, 2015

(54) ROTARY DAMPER DEVICE WITH ONE-WAY CLUTCH

(75) Inventor: Kei Shimozaki, Yokohama (JP)

(73) Assignee: NIFCO INC., Yokohama-shi, Kanagawa (JP)

( * ) Notice: Subject to any disclaimer, the term of this patent is extended or adjusted under 35 U.S.C. 154(b) by 0 days.

(21) Appl. No.: 14/118,406

(22) PCT Filed: May 15, 2012

(86) PCT No.: PCT/JP2012/003170
§ 371 (c)(1),
(2), (4) Date: Nov. 18, 2013

(87) PCT Pub. No.: WO2012/157259
PCT Pub. Date: Nov. 22, 2012

(65) Prior Publication Data
US 2014/0083809 A1    Mar. 27, 2014

(30) Foreign Application Priority Data

May 16, 2011  (JP) .................................. 2011-109603

(51) Int. Cl.
*F16D 41/00* (2006.01)
*F16F 9/12* (2006.01)
(52) U.S. Cl.
CPC . *F16D 41/00* (2013.01); *F16F 9/12* (2013.01); *F16D 2300/22* (2013.01)
(58) Field of Classification Search
USPC ................. 188/82.1, 290, 292, 296, 307, 293
See application file for complete search history.

(56) References Cited

U.S. PATENT DOCUMENTS

| 7,214,161 | B2 | 5/2007 | Jinbo | |
|---|---|---|---|---|
| 8,177,042 | B2 * | 5/2012 | Okabayashi et al. | 188/293 |
| 8,689,952 | B2 * | 4/2014 | Sato | 188/307 |
| 2002/0043127 | A1 * | 4/2002 | Takahashi | 74/573 R |
| 2003/0173165 | A1 | 9/2003 | Muller et al. | |
| 2007/0108000 | A1 * | 5/2007 | Derr et al. | 188/290 |

(Continued)

FOREIGN PATENT DOCUMENTS

| CN | 1629512 A | 6/2005 |
|---|---|---|
| CN | 1853054 A | 10/2006 |

(Continued)

OTHER PUBLICATIONS

PCT, "International Search Report for PCT/JP2012/003170".

(Continued)

*Primary Examiner* — Christopher Schwartz
(74) *Attorney, Agent, or Firm* — Manabu Kanesaka

(57) ABSTRACT

A rotary damper device with a one-way clutch includes a rotary damper having a damper housing having a viscous fluid sealed inside, and a rotor having a rotor blade received rotatably inside the damper housing and a rotor shaft; and the one-way clutch including an inner member having a recessed portion on an outer perimeter portion and coaxially joined to the rotor shaft, an outer member having an inner gear, and a gear housed in the recessed portion to engage with the inner gear. When the outer member rotates in a positive direction, the outer member rotates independently from the inner member. When the outer member rotates in a negative direction, the gear couples and the outer member and the inner member rotate together. The inner member has a portion larger than the rotor shaft. The outer member has a locking portion to be locked on the inner member.

6 Claims, 6 Drawing Sheets

(56) References Cited

U.S. PATENT DOCUMENTS

| | | |
|---|---|---|
| 2008/0302619 A1* | 12/2008 | Cultraro ................. 188/291 |
| 2014/0001007 A1 | 1/2014 | Shimozaki |
| 2014/0284155 A1* | 9/2014 | Zhang et al. ............. 188/292 |

FOREIGN PATENT DOCUMENTS

| | | |
|---|---|---|
| CN | 103477113 A | 12/2013 |
| JP | H10-184734 A | 7/1998 |
| JP | 2001-056037 A | 2/2001 |
| JP | 2005-090580 A | 4/2005 |
| JP | 2008-163667 A | 7/2008 |

OTHER PUBLICATIONS

China Patent Office, "Office Action for CN 201280035290.2," Jan. 14, 2015.

* cited by examiner

ROTARY DAMPER DEVICE WITH ONE-WAY CLUTCH

RELATED APPLICATIONS

The present application is National Phase of International Application No. PCT/JP2012/003170 filed May 15, 2012, and claims priority from Japanese Applications No. 2011-109603 filed May 16, 2011.

TECHNICAL FIELD

The present invention relates to a rotary damper device with a one-way clutch, for damping only rotation in one direction of a gear or other rotating member.

BACKGROUND TECHNOLOGY

A rotary damper is conventionally used for the purpose of gently moving a door, or the like, urged in one opening or a closing direction. A rotary damper has a damper housing having a viscous fluid sealed inside and a rotor provided with a rotor blade housed inside the damper housing and a rotor shaft projecting on the rotor blade from the damper housing, and is joined to a gear or other rotating member to damp rotation on the rotor shaft. Such rotary damper may be used as a rotary damper device including a one-way clutch in combination with a one-way clutch for generating a damping force on only rotation in one direction (for example, Patent Document 1).

In the rotary damper device including a one-way clutch according to Patent Document 1, the one-way clutch is configured with a cylindrical inner member having a recessed portion on an outer perimeter portion, a cylindrical outer member having a gear on an inner perimeter portion facing an outer perimeter portion of the inner member, and a gear received in the recessed portion of the inner member to engage with the gear. Also, the gear rotates inside the recessed portion and the outer member rotates independently of the inner member during rotation of the outer member in a positive direction relative to the inner member, and the gear couples to a corner portion formed on one side in a circumferential direction of the recessed portion and the outer member and the inner member rotate as one body during rotation of the outer member in a negative direction relative to the inner member. The configuration is such that the inner member is coaxially coupled to an outer end of the rotor shaft of the rotary damper.

PRIOR ART DOCUMENTS

Patent Documents

Patent Document 1: Japanese Unexamined Patent Publication No. 2008-163667

SUMMARY OF THE INVENTION

Problem to be Solved by the Invention

In the rotary damper device including a one-way clutch described in Patent Document 1, the one-way clutch is combined by inserting the inner member into the cylindrical outer member from the axial direction, but no means for restricting relative movement in the axial direction is provided on either member. Also, the one-way clutch is held so as not to come apart, with the outer member and the inner member being held in the axial direction between a base member on which the rotary damper device including a one-way clutch is installed and the rotary damper joined to the base member. Therefore, there is a problem that the one-way clutch comes apart in a state in which the rotary damper device including a one-way clutch has not been installed on the base member. In response to such problem, there is conceived a method in which an annular groove extending in the circumferential direction is formed on one of the inner perimeter portion of the outer member and the outer perimeter portion of the inner member, and a protruding portion to slidably fit in the annular groove in the circumferential direction is formed on the other, so that relative movement in the axial direction of the inner member and the outer member is restricted by the coupling between the annular groove and the protruding portion. However, because a comparatively large load is applied to the one-way clutch, it cannot be considered that there is necessarily sufficient structural strength with only coupling between the annular groove and the protruding portion.

The present invention was conceived in consideration of the above background, and an object thereof is to increase the structural strength of a one-way clutch using a simple structure in a rotary damper device including a one-way clutch.

Means for Solving the Problem

In order to achieve the abovementioned object, the present invention is a rotary damper device including a one-way clutch having: a rotary damper (2) having a damper housing (11) having a viscous fluid sealed inside, and a rotor (12) having a rotor blade (28) received rotatably inside the damper housing and a rotor shaft (29) disposed projecting along a rotating shaft of the rotor blade and projecting to the outside of the damper housing; and a one-way clutch (3) including an inner member (35) formed in a cylindrical shape having a recessed portion (47) on an outer perimeter portion and coaxially joined to an outer end of the rotor shaft, an outer member (36) formed in a tubular shape and having an inner gear (63) on an inner perimeter portion facing the outer perimeter portion of the inner member, and a gear (37) housed in the recessed portion to engage with the inner gear. When the outer member rotates in a positive direction relative to said inner member, said gear rotates inside said recessed portion and said outer member rotates independently from said inner member. When said outer member rotates in a negative direction relative to said inner member, said gear couples to a corner portion (49) formed on one side in a circumferential direction of said recessed portion and said outer member and said inner member rotate together. The inner member has a portion (41) larger in a radial direction than the rotor shaft and facing the damper housing. The outer member has a locking portion (62) on a rotary damper side of an end portion extending between the inner member and the damper housing, to be locked on the inner member.

According to this invention, because the locking portion extends to between the inner member and the damper housing, relative displacement in the axial direction of the outer member relative to the inner member is restricted by contact of the locking portion with the inner member or the damper housing, and the outer member and the inner member are prevented from coming apart.

Another aspect of the present invention resides in that the locking portion is disposed extending along the rotary damper side of the end portion of the outer member.

According to this configuration, the structural strength of the locking portion can be improved.

Another aspect of the present invention resides in that: an annular groove extending in the circumferential direction is formed on one of the inner perimeter portion of the outer member or the outer perimeter portion of the inner member; and a protruding portion (52) to slidably fit in the annular groove (65) in the circumferential direction is formed on the other of the inner perimeter portion of the outer member or the outer perimeter portion of the inner member.

According to this configuration, relative displacement in the axial direction between the outer member and the inner member is restricted, and the outer member and the inner member are prevented from coming apart.

Another aspect of the present invention resides in that: the outer end of the rotor shaft is formed in a prism shape; the inner member has an angular through-hole for the outer end of the rotor shaft to pass through to be incapable of rotation; and a portion of the outer end of the rotor shaft having passed through the through-hole is pushed widely to engage to a hole edge of the through hole.

According to this configuration, the structure of joining between the rotor shaft and the inner member can be simplified.

Effect of the Invention

According to the above configuration, the structural strength of a one-way clutch can be increased using a simple structure in a rotary damper device including a one-way clutch.

EMBODIMENTS OF THE INVENTION

Figure 1:
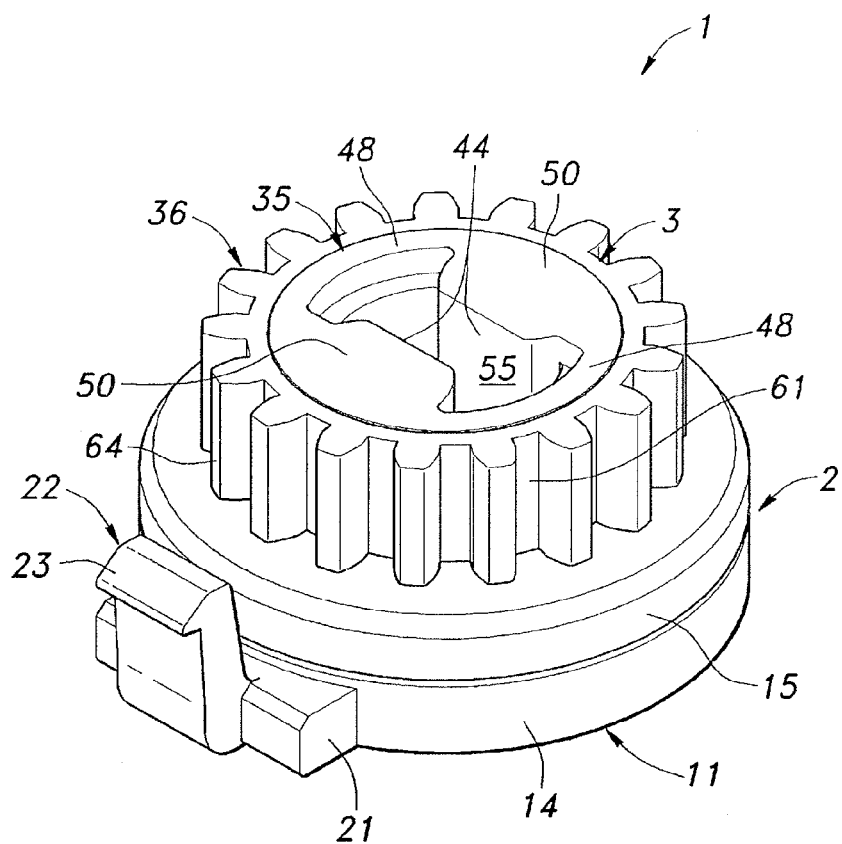
FIG. 1 is a perspective view of the rotary damper device according to the embodiment.

The embodiments applying the present invention are described in detail below while referring to the drawings.

The rotary damper device including a one-way clutch according to the embodiment (hereinafter referred to simply as "rotary damper device") is a combination of a rotary damper 2 and a one-way clutch 3 as a rotating member, as illustrated in FIGS. 1 to 5.

Figure 3:
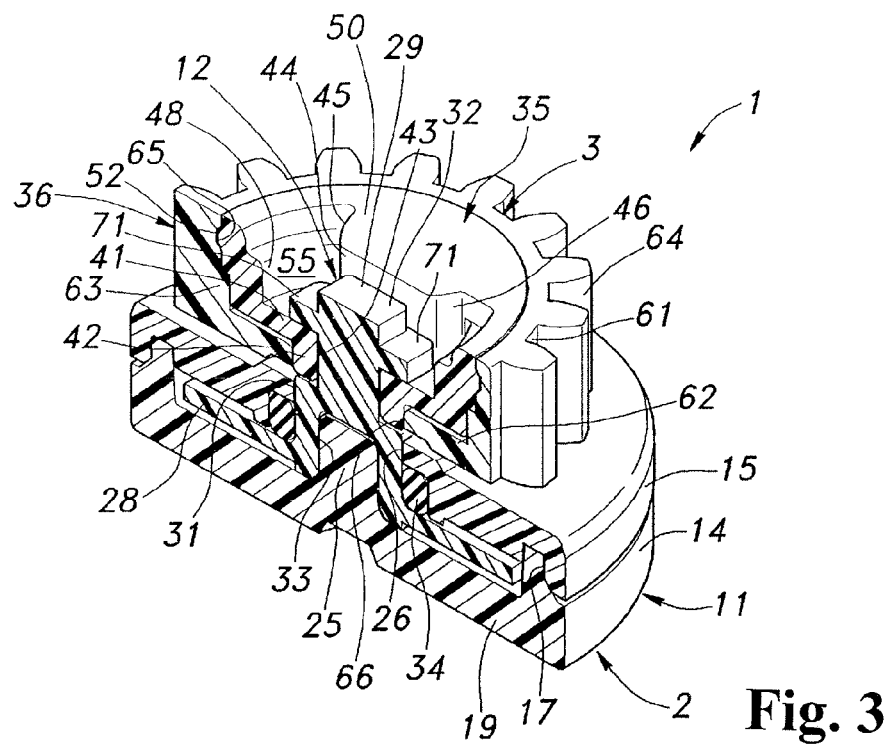
FIG. 3 is a cross-sectional perspective view along the line in FIG. 2.
Figure 4:
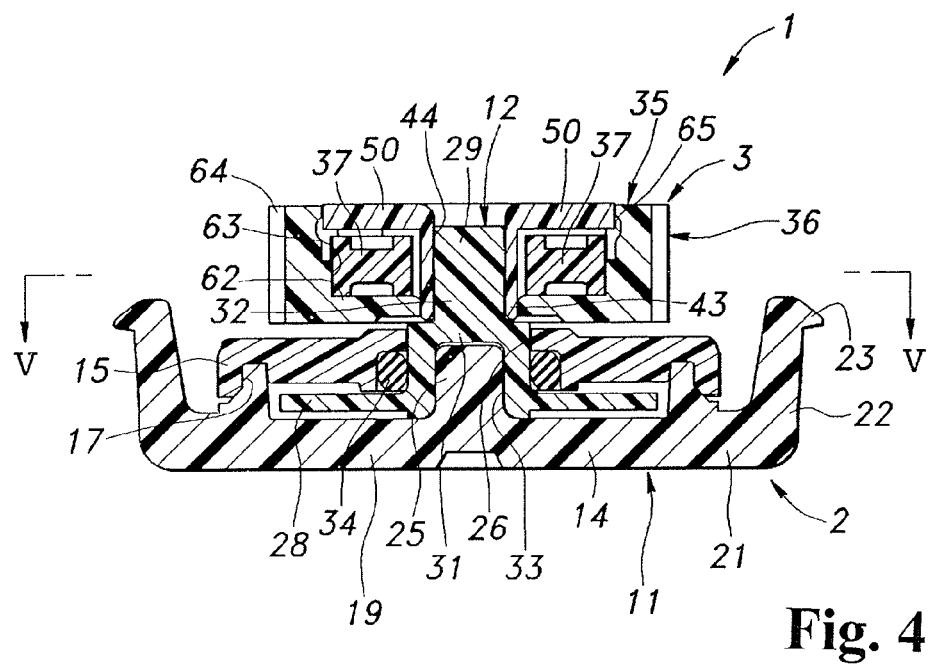
FIG. 4 is a cross-sectional view along the line IV-IV in FIG. 2.

As illustrated in FIGS. 3 and 4, the rotary damper 2 includes a damper housing 11 having a viscous fluid sealed inside and a rotor 12 received rotatably inside the damper housing. The damper housing 11 has a bottomed-cylinder-shaped bottom member 14 and a disk-form lid member 15 for closing the open end of the bottom member 14, both being formed form synthetic resin. An annular fitting groove 17 allowing fitting with the open end of the bottom member 14 is provided on the circular edge portion of the lid member 15. The bottom member 14 and the lid member 15 are joined together by friction welding (vibration welding) in a state in which the open end of the bottom member 14 is fitted in the fitting groove 17.

Figure 2:
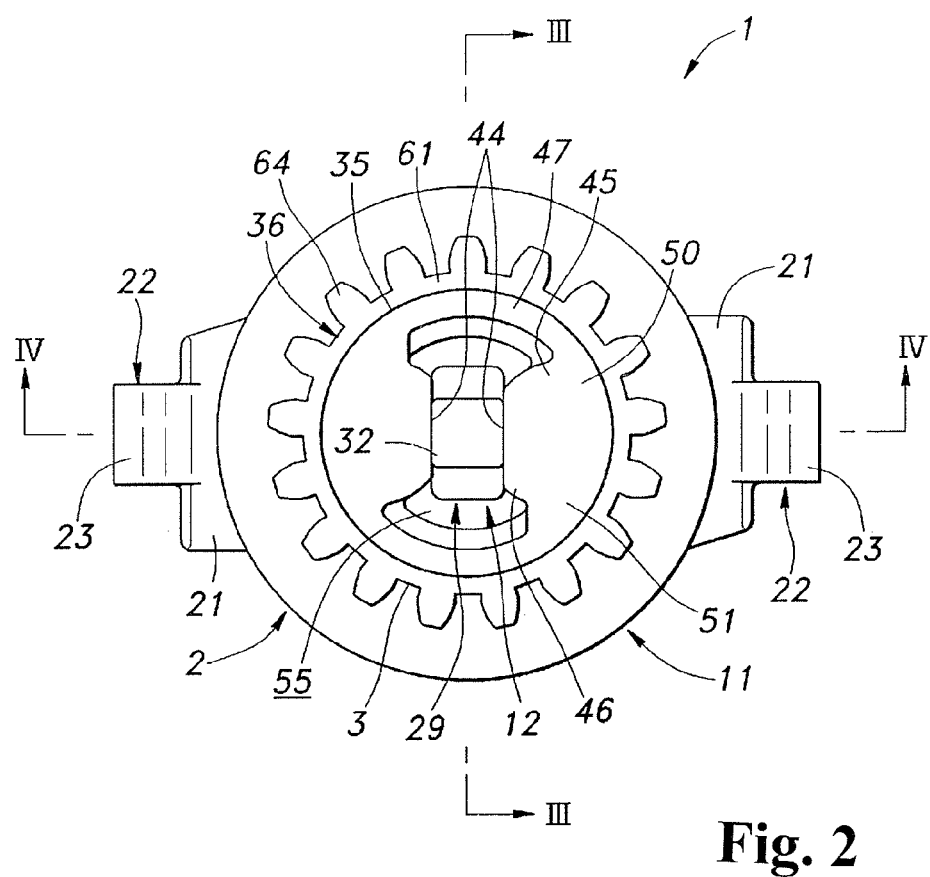
FIG. 2 is a plan view of the rotary damper device according to the embodiment.

As illustrated in FIGS. 1 and 2, two flange portions 21 extending outward in the radial direction are provided with a mutual spacing of 180° in the circumferential direction on a portion of the bottom member 14 on the side toward the bottom of the outer perimeter surface. An elastic claw 22 extending toward the side toward the open end of the bottom member 14 in parallel with the axial direction of the bottom member 14 is provided on each projecting end of each flange portion 21. Each elastic claw 22 has a claw portion 23 projecting outward in the radial direction of the bottom member 14 and having a non-return surface facing the side toward the base end of the elastic claw 22, and is capable of being tilted down in the radial direction of the bottom member 14 by elastic deformation.

As illustrated in FIGS. 3 and 4, a cylindrical shaft 25 projecting toward the side of the lid member 15 along the axis of the bottom member 14 is placed to project in the center portion of the bottom portion 19 of the bottom member 14. A through-hole 26 which is a round hole coaxial with the shaft 25 is formed in the center portion of the lid member 15.

The rotor 12 has a disk-form rotor blade 28 and a rotor shaft 29 projecting along the axis toward one side from the center of the rotor blade 28. The rotor 12 is formed from thermoplastic resin, and the rotor blade 28 and the rotor shaft 29 are integrally formed. A base end portion 31 of the rotor shaft 29 is formed in a cylindrical shape, and a leading end portion 32 continuing on the base end portion 31 is formed in a square-columnar form.

A bearing hole 33 as a bottom hole circular in cross section is provided on the side of the rotor blade 28 opposite the side where the rotor shaft 29 is placed to project. The rotor blade 28 is received in a space demarcated by the bottom member 14 and the lid member 15 (that is, the internal space of the damper housing 11), and is axially supported to be capable of rotation on the shaft 25 in the bearing hole 33. Here, the rotor shaft 29 passes through the through-hole 26, and the leading end portion 32 and a portion of the base end portion 31 project outside of the damper housing 11. In this state, the outer perimeter surface of the base end portion 31 faces opposite the hole wall of the through-hole 26.

A flexible O-ring 34 is interposed between the base end portion 31 of the rotor shaft 29 and the through-hole 26. The O-ring 34 is for sealing the gap between the rotor shaft 29 and the through-hole 26 and preventing a viscous fluid, for example, silicon oil, filled in the internal space of the damper housing 11 from flowing out from the through-hole 26.

The rotary damper 2 configured as above applies rotation resistance of the rotor 12 (damps rotation) by fluid resistance of the viscous fluid when the rotor 12 rotates relative to the damper housing 11. The rotation resistance of the rotary damper 2 can be adjusted by suitably changing the viscosity of the viscous fluid or the shape of the rotor 12.

Figure 5:
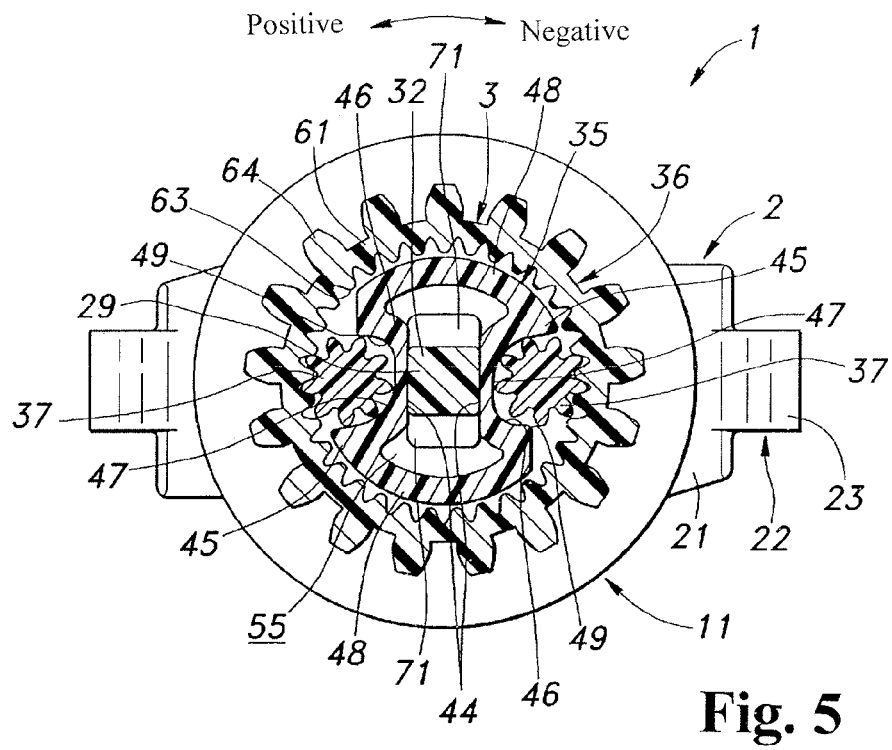
FIG. 5 is a cross-sectional view along the line V-V in FIG. 4.

As illustrated in FIGS. 3 to 5, the one-way clutch 3 has an inner member 35 joined to the rotor shaft 29 to rotate as one body with the rotor shaft 29, an outer member receiving the inner member 35 to be capable of relative rotation, and a pair of planetary gears 37 interposed between the inner member 35 and the outer member 36. The inner member 35, outer member 36, and planetary gears 37 respectively are formed from a resin material.

The inner member 35 has a tubular shape having a floor plate 41 on one end and having the other end open. A cylindrical support shaft 42 coaxial with the floor plate 41 is placed projecting in the center portion of the lower face of the floor plate 41. An insertion hole 43 running through the floor plate 41 and the support shaft 42 as one body along the axis thereof are provided in the center portion thereof. The cross section of the insertion hole 43 is a square shape.

Figure 6:
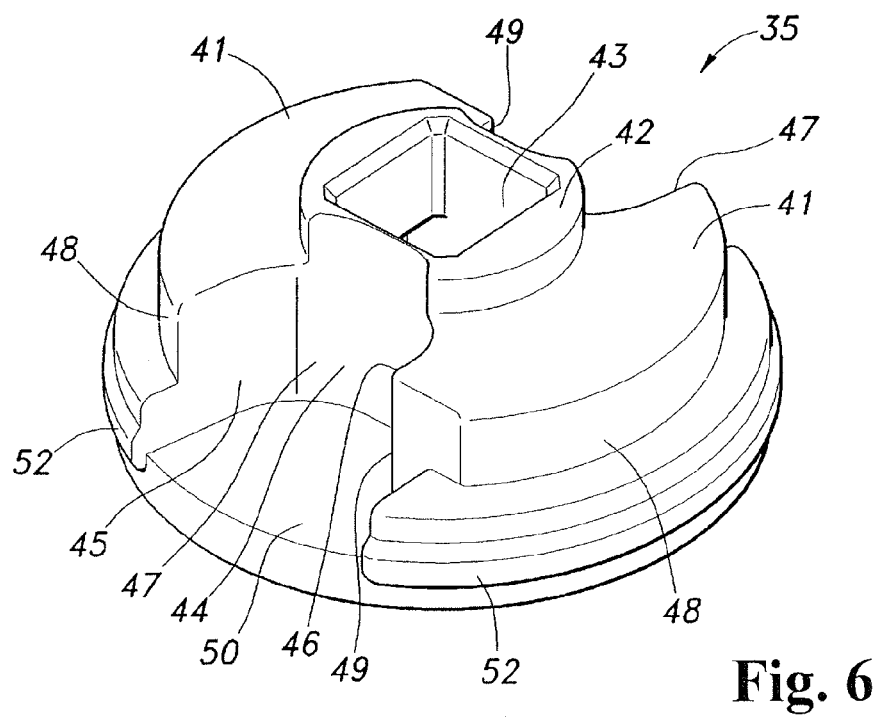
FIG. 6 is a perspective view of the inner member according to the embodiment.
Figure 7:
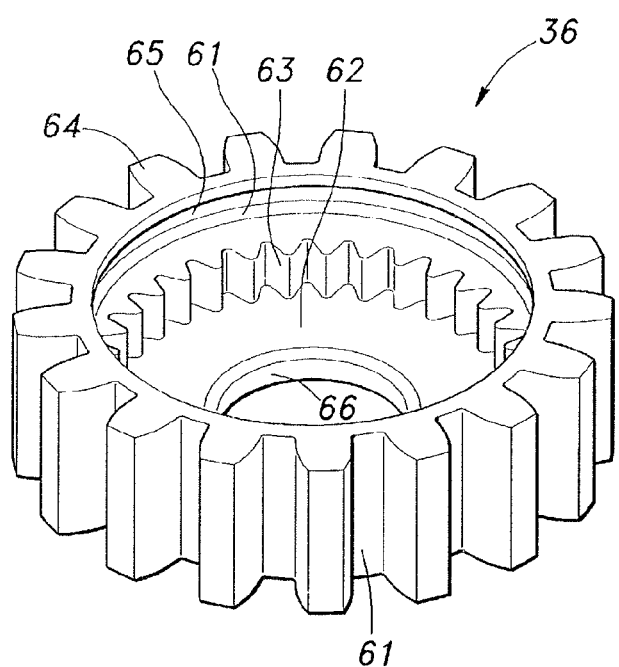
FIG. 7 is a perspective view of the outer member according to the embodiment.

A restricting wall 44 is placed upright along each of a group of opposite sides mutually facing the insertion hole 43 on the upper face of the base plate 41. The side ends of the restricting wall 44 extend outward from one side of the insertion hole 43. A first wall 45 and a second wall 46 continuing on the two side ends of each restricting wall 44 extend outward in the radial direction of the inner member 35. Recessed portions 47 open outward in the radial direction are demarcated with a spacing of 180° in the circumferential direction by the outer wall surfaces of the restricting walls 44, first wall 45, and second wall 46. The details are described later, but a planetary gear 37 is received inside each recessed portion 47. The first wall 45 of one recessed portion 47 and the second wall of the other recessed portion 47 are continued by an arc wall 48 between the two recessed portions 47. FIG. 6 is a diagram illustrating vertically inverted the inner member 35 depicted in FIG. 3, and the like.

As illustrated in FIGS. 5 and 6, the first wall 45 and the second wall 46 respectively continue smoothly on the restricting walls 44, and the surface of the recessed portion 47 is formed into a smooth curved surface. The first wall 45 extends onto an arc elongating the outer perimeter surface of the arc wall 48. Meanwhile, the second wall 46 is shorter by about half in extension length in the radial direction of the inner member 35 compared with the first wall 45, and has a corner portion 49 on the extended end portion.

As illustrated in FIG. 3, the upper ends of the restricting wall 44, first wall 45, and second wall 46 are connected together by a top wall 50. That is, the upper end of the recessed portion 47 is sealed by the top wall 50. The upper end portion of each of the pair of arc walls 48 is enlarged in diameter compared with the lower portion, and a raised strip 52 extending along the circumferential direction is formed on the outer wall surface thereof.

From a different viewpoint, the inner member 35 configured in the above manner has an internal space 55 open upward demarcated by the inner wall surfaces (surfaces facing the axial center side) of the floor plate 41, restricting wall 44, first wall 45, second wall 46, and arc wall 48. The internal space 55 connects through to the insertion hole 43.

As illustrated in FIGS. 3 to 5 and 7, the outer member 36 is formed in a bottomed-cylindrical form including a cylindrical side perimeter wall 61 and a disk-form floor plate 62 provided on one end of the side perimeter wall 61. The side toward the open end (lower end side) on the inner perimeter portion of the side perimeter wall 61 is enlarged in diameter with a step difference. An inner gear 63 including a plurality of inner teeth is formed on the side toward the floor plate 62 (upper end side) on the inner perimeter surface of the side perimeter wall 61, and an outer gear 64 including a plurality of outer teeth is formed on the outer perimeter surface. Also, a continuous annular groove 65 extending along the circumferential direction is formed on a portion toward the open end on the inner perimeter surface of the side perimeter wall 61. A through-hole 66 circular in cross section allowing the support shaft 52 of the inner member 35 to pass through while slidably contacting is formed in the center of the floor plate 62. In other words, the floor plate 62 has an annular structure provided with a through-hole 66 in the center.

The outer member 36 receives the inner member 35 in the space demarcated by the side perimeter wall 61 and the floor plate 62. Here, the support shaft 42 of the inner member 35 is inserted while slidably contacting into the through-hole 66 of the outer member 36, and the raised strip 52 fits in the annular groove 65. The raised strip 52 fits movably inside the annular groove 65 in the direction of extension of the annular groove 65, and therefore the outer member 36 is supported to be capable of relative rotation in the circumferential direction while being prevented from coming off in the axial direction. Here, the inner gear 63 of the outer member 36 is configured so as not to slidably contact the inner member 35.

Each of the pair of planetary gears 37 is a flat gear having a prescribed length in the axial direction, and is received in each recessed portion 47 so that the axis becomes in parallel with the axis of the inner member 35 and the outer member 36. The planetary gear 37 engages with the inner gear 63 of the outer member 36 in the state being received in the recessed portion 47.

In the one-way gear 3 configured as above, the planetary gear 37 induced to rotate by the inner gear 63 of the outer member 36 moves toward the first wall 45 inside the recessed portion 47 when the outer member 36 rotates in the positive direction (counterclockwise) relative to the inner member with the condition viewed from above as illustrated in FIG. 5 as reference. At this time, the planetary gear 37 is restricted from movement toward the direction of the first wall 45 by contacting the first wall 45 and idle rotates while slidably contacting on the first wall 45. The first wall 45 extends further outward in the radial direction from the position of contact with the teeth tips of the rotating planetary gear 37, and therefore the planetary gear 37 idle rotates smoothly on the first wall 45 without engaging with the boundary portion between the first wall 45 and the arc wall 48. Therefore, the inner member 35 does not rotate even though the outer member 36 rotates.

On the other hand, the planetary gear induced to rotate by the inner gear 63 of the outer member 36 moves to the side of the second wall 46 and engages with the corner portion 49 of the second wall 46 and becomes incapable of rotation when the outer member 36 rotates in the negative direction (clockwise) relative to the inner member 35. The inner member 35 thereby couples on the outer member 36 by way of the planetary gear 37 and rotates as one body with the outer member 36.

In the one-way clutch 3 as above, the inner member 35 and the outer member 36 can relatively rotate when the outer member 36 starts to relatively rotate relative to the inner member 35, and the inner member 35 and the outer member 36 rotate as one body when the outer member 36 starts to relatively rotate relative to the inner member 35.

The structure of joining and method of forming of the rotary damper 2 and the one-way clutch 3 configured above are described. First, the leading end portion 32 of the rotor shaft 29 of the rotary damper 2 is passed through the insertion hole 43 of the inner member 35 of the one-way clutch 3 and is brought to project inside the internal space 55. Because the leading end portion 32 and the insertion hole 43 both are formed in square shapes in cross section and have shapes for mutual insertion-coupling, the rotor shaft 29 and the inner member 35 rotate as one body with relative rotation around the axis of the rotor shaft 29 being restricted.

Next, the leading end portion 32 of the rotor shaft 29 is deformed using a heated pressing piece. The pressing piece is a metal rod-form member capable of being pressed into the internal space 55 of the inner member 35. The pressing piece is raised to a temperature capable of deforming the leading end portion 32, and then is pressed against the leading end portion 32 from the axial direction of the rotor shaft 29. The leading end portion 32 is thereby heated and pressed and deformed by the pressing piece. Here, because the restricting walls 44 are present on both sides of the leading end portion 32, the position where flexibility was increased by heating projects in a direction where the restricting walls 44 are not present in the radial direction of the rotor shaft 29 and form protruding portions 71. That is, the pair of restricting walls 44 guides the direction of projection of the protruding portions 71. In the present embodiment, two protruding portions 71 are formed facing mutually oppositely outward in the radial direction of the rotor shaft 29 by deforming two side portions of the leading end portion 32 not following the restricting walls 44 (see FIGS. 2 and 3). Each protruding portion 71 couples on a perimeter edge portion of the insertion hole 43 and prevents the rotor shaft 29 from coming out from the insertion hole 43. The rotary damper 2 and the one-way clutch 3 are thereby joined and the rotary damper device 1 is formed.

In the rotary damper device 1 as configured above, in the state having fixed the damper housing 11, the inner member 35 does not rotate and rotation resistance (damping force) by the rotary damper 2 is not generated even though the outer member 36 rotates when the outer member 36 rotates in the positive direction relative to the inner member 35, but the inner member 35 and the rotor shaft 29 rotate together with the outer member 36 and rotation resistance (damping force) by the rotary damper 2 is generated when the outer member 36 rotates in the negative direction relative to the inner member 35.

Also, the outer member 36 cannot move upward and downward in the axial direction relative to the inner member 35 because the floor plate 62 of the outer member 36 is placed below the floor plate 51 of the inner member 35 joined to the rotor shaft 29, in other words, in the space between the floor plate 41 and the lid member 15 of the damper housing 1, as illustrated in FIG. 3. Therefore, the one-way clutch 3 does not come apart even if the coupling between the annular groove 65 and the raised strip 52 were released. That is, separation of the outer member 36 from the inner member 35 is prevented by locking of the floor plate 62 of the outer member 36 as a locking portion on the floor plate 41 of the inner member 35, or by contact of the rotary damper 2 with the lid member 15.

Figure 8:
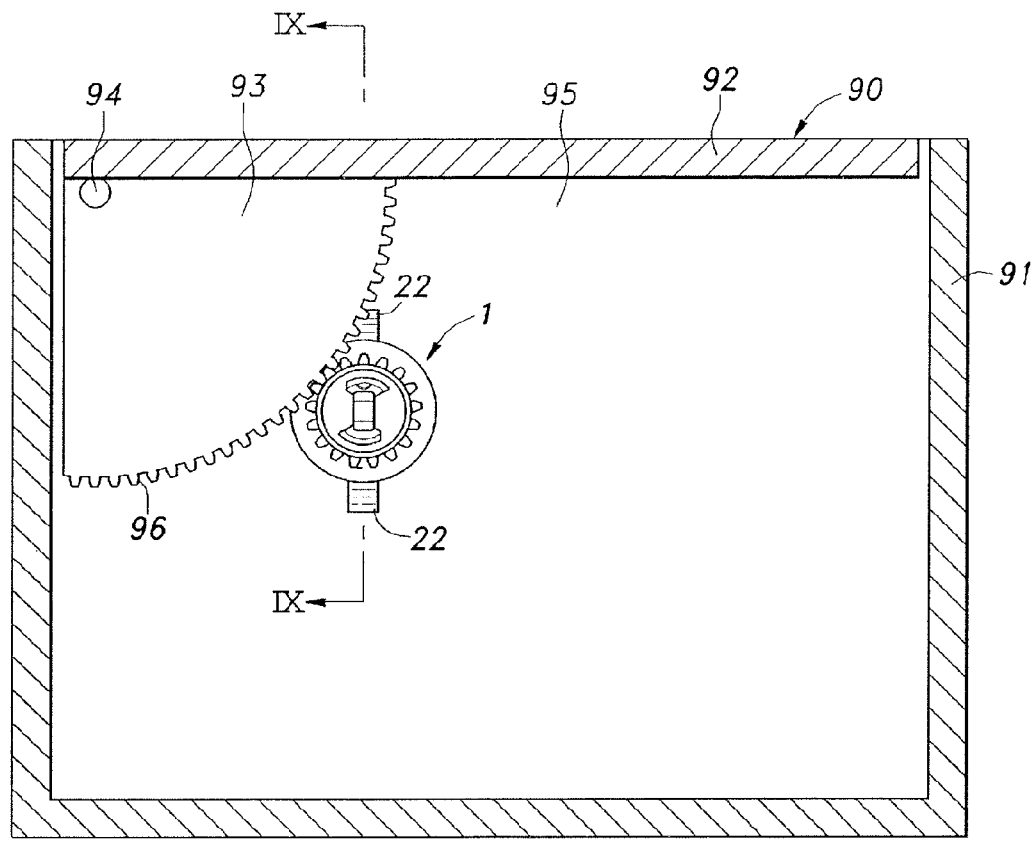
FIG. 8 is a side view illustrating a box with a lid applying the rotary damper device according to the embodiment.
Figure 9:
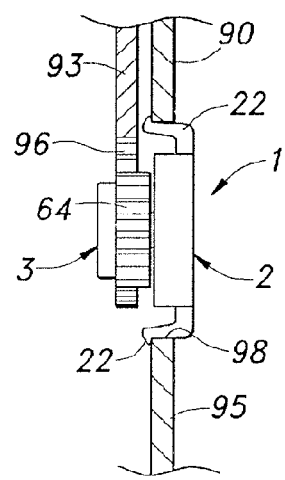
FIG. 9 is a side view of the rotary damper device according to the embodiment, viewed along the line IX-IX in FIG. 8.

FIGS. 8 and 9 illustrate an example of use of the rotary damper device 1. The rotary damper device 1 is used, for example in a cup holder or other lidded box 90. The lidded box 90 has a box 91 having an upper side open, and a flat-plate-form lid 92 for closing to freely open and close the opening of the box 91. The lid 92 has a fan-shaped ear portion 93 placed upright on a side edge portion perpendicularly to a main surface thereof, and is supported rotatably on a side wall 95 of the box 91 by a shaft 94 provided on the ear portion 93. A rack 96 is formed on an arc-form perimeter edge portion of the ear portion 93. Although not illustrated, the lidded box 90 is provided with a lock device for keeping the lid 92 in a state closing the opening, and a spring for urging the lid to rotate in the direction to open the opening.

The rotary damper device 1 is installed in an installation hole 98 being a through-hole formed on the side wall 95 of the box 91. The installation hole 98 has a circular main portion not illustrated, and two cutout portions cut out outward in the radial direction from the perimeter edge of the main portion. The two cutout portions are provided in point-symmetric positions with the center of the main portion as the axis of symmetry. The rotary damper device 1 is inserted into the main portion of the installation hole 98. Here, the rotary damper 1 is supported in the installation hole 98 with the flange portions 21 coupling on the perimeter edge of the installation hole 98 and the elastic claws 22 coupling in the cutout portions of the installation hole 98. In this state, the outer gear 64 of the outer member 36 of the rotary damper device 1 engages with the rack 96.

In the case in which the rotary damper device 1 is applied to a lidded box 90 as above, when the lid 92 opens receiving the urging force of the spring, the outer gear 96 rotates in the negative direction by the rack 96, the inner member and the rotor shaft 29 rotate together, the rotary damper 2 generates rotation resistance, and the speed of opening of the lid 92 is reduced. On the other hand, when the lid is closed, the outer member 36 rotates in the positive direction by the rack 96, the inner member and the rotor shaft 29 do not rotate, and the rotary damper 2 does not generate rotation resistance.

The description of a specific embodiment is finished above, but the present invention is not limited to the abovementioned embodiment and can be carried out broadly in various forms. In the embodiment described above, the annular floor plate 62 is provided on the end portion of the outer member 36 on the side toward the rotary damper 2, but a projecting piece projecting inward in the radial direction from the end portion of the side perimeter wall 61 may be used instead of the floor plate 62.

EXPLANATION OF THE SYMBOLS

1: Rotary damper device, 2: Rotary damper, 3: One-way clutch, 11: Damper housing, 12: Rotor, 28: Rotor blade, 29: Rotor shaft, 31: Base end portion, 32: Leading end portion, 35: Inner member, 36: Outer member, 37: Planetary gear, 41: Floor plate, 43: Through-hole, 44: Restricting wall, 45: First wall, 46: Second wall, 47: Recessed portion, 48: Arc wall, 49: Corner portion, 50: Top wall, 52: Raised strip (Protruding portion), 55: Inner space, 62: Floor plate (Checking portion), 63: Inner gear, 64: Outer gear, 65: Annular groove, 71: Protruding portion, 80: Pressing piece, 81: Projecting piece, 90: Lidded box, 91: Box, 92: Lid

What is claimed is:
1. A rotary damper device with a one-way clutch, comprising:
a rotary damper having a damper housing having a viscous fluid sealed inside, and a rotor having a rotor blade received rotatably inside said damper housing and a rotor shaft disposed to project along a rotating axis of said rotor blade and project to outside of said damper housing; and
the one-way clutch including
an inner member formed in a cylindrical shape having a recessed portion on an outer perimeter portion and coaxially joined to an outer end of said rotor shaft,
an outer member formed in a tubular shape and having an inner gear on an inner perimeter portion facing said outer perimeter portion of said inner member, and
a gear housed in said recessed portion to engage with said inner gear,
wherein when said outer member rotates in a positive direction relative to said inner member, said gear rotates inside said recessed portion and said outer member rotates independently from said inner member, and when said outer member rotates in a negative direction relative to said inner member, said gear couples to a corner portion formed on one side in a circumferential direction of said recessed portion and said outer member and said inner member rotate together;

wherein said inner member has a floor portion having a through-hole through which said rotor shaft passes and facing the damper housing; and said outer member has a locking portion extending between said inner member and said damper housing.

2. The rotary damper device with a one-way clutch according to claim 1, wherein said locking portion is disposed to extend annularly along an end portion of said outer member.

3. The rotary damper device with a one-way clutch according to claim 1, wherein an annular groove extending in the circumferential direction is formed on one of said inner perimeter portion of said outer member or said outer perimeter portion of said inner member; and a protruding portion to slidably fit in said annular groove in the circumferential direction is formed on the other of said inner perimeter portion of said outer member or said outer perimeter portion of said inner member.

4. The rotary damper device with a one-way clutch according to claim 1, wherein the outer end of said rotor shaft is formed in a prism shape;

said inner member has an angular through-hole for the outer end of said rotor shaft to pass through to be incapable of rotation; and a portion of the outer end of said rotor shaft having passed through said through-hole is pushed widely to engage to a hole edge of said through-hole.

5. The rotary damper device with a one-way clutch according to claim 1, wherein the inner member further includes an outer perimeter portion extending upwardly from the floor plate and having said recessed portion, and a supporting shaft projecting from a center of the floor plate toward the damping housing to surround and support the rotor shaft.

6. The rotary damper device with a one-way clutch according to claim 5, wherein the locking portion engages the surrounding shaft of the inner member.

* * * * *